No. 703,164. Patented June 24, 1902.
W. H. TUCK.
ANIMAL DIPPING APPARATUS.
(Application filed Dec. 13, 1901.)
(No Model.)
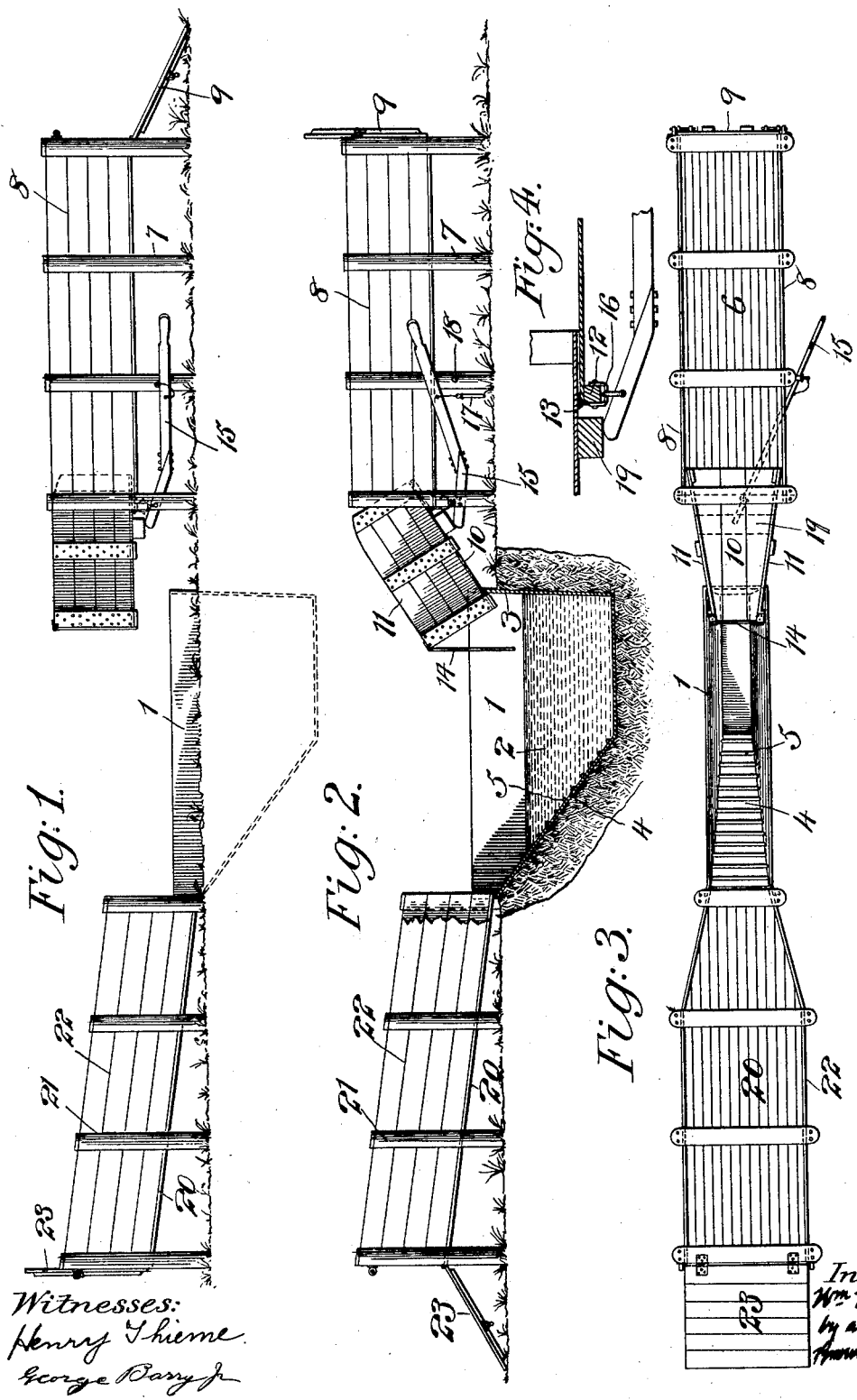

UNITED STATES PATENT OFFICE.

WILLIAM H. TUCK, OF LINCOLN, NEBRASKA, ASSIGNOR TO WEST DISINFECTING COMPANY, OF NEW YORK, N. Y., A CORPORATION OF NEW YORK.

ANIMAL-DIPPING APPARATUS.

SPECIFICATION forming part of Letters Patent No. 703,164, dated June 24, 1902.

Application filed December 13, 1901. Serial No. 85,735. (No model.)

*To all whom it may concern:*

Be it known that I, WILLIAM H. TUCK, a citizen of the United States, and a resident of Lincoln, in the county of Lancaster and State of Nebraska, have invented a new and useful Improvement in Animal-Dipping Apparatus, of which the following is a specification.

My invention relates to an improvement in animal-dipping apparatus, the object being to provide an apparatus in which the tank into which the animal is to be dipped is shielded from the view of the animal until it is too late for the animal to recede.

A further object is to provide an apparatus in which an endwise-tilting platform is provided which is so arranged that it will project the animal to be dipped into the dipping-tank in such a manner as to prevent the liability of injuring the said animal.

A still further object is to provide improvements in the construction, form, and arrangement of the several parts of the apparatus whereby the dipping and dripping processes may be rapidly carried out.

A practical embodiment of my invention is represented in the accompanying drawings, in which—

Figure 1 represents the apparatus in side elevation with the tilting platform in its raised position in line with the animal-admission chute, the door at the entrance to the admission-chute being shown in its lowered position to permit the entrance of animals into the admission-chute, and the door at the farther end of the dripping-pen being shown in its closed position to prevent the escape of the animals therefrom. Fig. 2 is a view in side elevation of the apparatus, the dipping tank or vat being shown in section, the tilting platform being shown in its tilted position for projecting the animal into the tank or vat, the door at the entrance to the admission-chute being shown in its closed position, while the door at the farther end of the dripping-pen is shown in its lowered position for permitting the escape of the animals from the dripping-pen. Fig. 3 is a top plan view of the apparatus, the tilting platform being shown in its raised position and the doors for the admission-chute and dripping-pen in the positions shown in Fig. 2. Fig. 4 is a detail view, on an enlarged scale, showing the manner of hinging the tilting platform and of hinging the lever for operating the platform.

The dipping tank or vat is denoted by 1, which tank or vat is fitted to receive therein a cleansing liquid 2—such, for instance, as the disinfectant known in the art as "chloronaphtholeum"—which liquid is intended to cleanse the skin of the animals submerged therein and also serves as an insecticide.

The tank 1 is preferably long and narrow, the width of the tank being such that it will not permit the animals to turn around therein. The rear end of the tank is preferably formed by a vertical wall 3, while the front end of tank is formed by a sloping wall 4, leading gradually upward from the bottom of the tank to a point in close proximity to the top thereof. This front sloping wall 4 is preferably provided with a plurality of cross-cleats 5 for insuring a better hold of the animals as they emerge from the tank.

An admission-chute is provided in front of the tank, while a dripping-pen is provided at the rear of the tank.

The admission-chute in the present instance comprises a platform 6, supported upon a plurality of side posts 7 and having side walls 8 uprising therefrom. This chute may or may not be provided with a top. The platform or floor 6 of the admission-chute is spaced above the ground-level, and the front end of the chute is provided with a swinging door 9, hinged at its lower edge to the platform or floor 6. This door 9 is fitted to be swung down onto the ground for the use of the animals when being led into the admission-chute. The tilting platform comprises a floor 10 and side walls 11, which in the present instance are shown as converging from the front end of the tilting platform toward its rear end. This tilting platform may or may not be provided with a top. The floor 10 of the tilting platform is hinged near its front end to the rear end of the admission-chute, so as to swing from a point in line with the admission-chute to quite an angle downwardly therefrom. In the present instance the tilting platform is secured to the cross-beam 12 of the admission-chute support by means of one or more hinges 13. The rear or discharge end of the tilting platform is provided with a door 14, which is hinged at its upper edge to the top of the rear end of the tilting platform. This door closes the discharge end of the tilting platform when the platform is in its normal or horizontal position, but swings away therefrom when the platform is tilted into its discharging position. This tilting platform is so located with respect to the dipping tank or vat 1 that when it is tilted into a position to project the animal therein into the tank the floor 10 of the tilting platform will rest upon the vertical front wall 3 of the said tank.

The means which I have shown for operating the tilting platform consists of a hand-lever 15, hinged near its rear end to the cross-beam 12 of the admission-chute support—in the present instance by means of a double hook or clevis 16, giving a free swinging movement of the said lever. This lever 15 is arranged diagonally beneath the admission-chute and tilting platform, with the inner end of its short arm in engagement with the bottom of the platform, while the outer end or long arm projects beyond the side of the admission-chute. This lever 15 is preferably bent in a vertical direction, so as to permit the use of a very long arm, and at the same time permit the floor of the admission-chute to be located reasonably near the ground. This lever may be locked in position to hold the tilting platform in its horizontal position in line with the admission-chute by any well-known locking means. That shown herein consists of a locking-pin 17, which may be inserted into a hole 18 in one of the supporting-posts 7 above the lever when the lever is in its depressed position.

A wearing-block 19 may be secured to the bottom of the tilting platform, across the same, in position to be engaged by the end of the short arm of the operating-lever 15.

The floor 20 of the dripping-pen leads upwardly and rearwardly from the upper end of the slanting rear wall 4 of the dipping tank or vat, which floor 20 is supported by a plurality of posts 21. The side walls of the dripping-pen are denoted by 22 and the pen may or may not be provided with a top.

A door 23 is hinged to the rear end of the floor 20 of the dripping-pen, which door may be swung up into position to close the rear end of the dripping-pen to prevent the escape of the animal therefrom or may be swung down into engagement with the ground for the use of the animals in leaving the said pen.

In operation the animals are driven one by one into the admission-chute and from thence into the tilting platform. When an animal is in position within the tilting platform, the hand-lever 15 is released, thus causing the platform to tilt into a position to direct the animal into the dipping-tank. As the platform is tilted the door 14, which prevented the animal from seeing the tank while being driven into the tilting platform, is automatically swung open to permit the animal to slide from the platform into the tank. The animal will then clamber up the rear wall 4 of the tank into the dripping-pen. If it is desired to keep the animal within the dripping-pen for any length of time, the door 23 at the rear end of the pen may be closed. When it is desired to release the animal, the door is opened and swung down into engagement with the ground, as hereinbefore described.

In practice it has been found extremely difficult to force the animals into the tank whenever they have been permitted to see the tank. By the use of the blind tilting platform hereinabove described I am enabled to handle the animals very much faster, for the reason that they cannot see the tank until they are being projected into the same by the tilting of the platform. Furthermore, this arrangement reduces to a minimum the liability of injuring the animals and at the same time prevents the animals from attempting to escape from being dipped, for the reason that they are being projected into the tank before they catch a sight of the same.

If desired, the door 9, which serves as an incline for permitting the admission of animals to the admission-chute, may be closed to prevent the animals from backing out of the admission-chute should they attempt to do so.

It is evident that the several parts may be made in different sizes to suit different requirements as to the particular animals to be dipped, and it is also evident that changes might be resorted to in the construction, form, and arrangement of the several parts without departing from the spirit and scope of my invention. Hence I do not wish to limit myself strictly to the structure herein set forth; but

What I claim is—

1. An animal-dipping apparatus comprising a tank, an admission-chute and an endwise-tilting platform hinged to the admission-chute arranged to project the animal into the tank when the platform is tilted, substantially as set forth.

2. An animal-dipping apparatus comprising a tank, an admission-chute, an endwise-tilting platform hinged thereto arranged to project the animal into the tank when the platform is tilted and a door for the discharge end of the platform, substantially as set forth.

3. An animal-dipping apparatus comprising a tank, an admission-chute, an endwise-tilting platform hinged thereto arranged to project the animals into the tank when the platform is tilted and a hand-lever for operating the platform, substantially as set forth.

4. An animal-dipping apparatus comprising a tank, an admission-chute, an endwise-tilting platform hinged thereto arranged to project the animals into the tank when the platform is tilted and a dripping-pen leading from the tank, substantially as set forth.

5. An animal-dipping apparatus comprising a tank, an admission-chute, an endwise-tilting platform hinged thereto arranged to project the animals into the tank when the platform is tilted and a door for closing the front end of the chute, the said door serving as an approach for the chute when the door is open, substantially as set forth.

In testimony that I claim the foregoing as my invention I have signed my name, in presence of two witnesses, this 3d day of December, 1901.

WILLIAM H. TUCK.

Witnesses:
LORREN R. NORTH,
MARK SPANGLE.